Feb. 22, 1955       F. B. BERGER ET AL       2,702,857
                    SQUARE ROOT COMPUTER

Filed March 8, 1946                          2 Sheets-Sheet 1

INVENTORS
FRANCE B. BERGER
JAMES S. ALLEN

BY *M. O. Hayes*

ATTORNEY

Feb. 22, 1955

F. B. BERGER ET AL 2,702,857

SQUARE ROOT COMPUTER

Filed March 8, 1946

INVENTORS
FRANCE B. BERGER
JAMES S. ALLEN

BY *M. O. Hayes*

ATTORNEY

United States Patent Office 2,702,857
Patented Feb. 22, 1955

2,702,857
SQUARE ROOT COMPUTER

France B. Berger, Watertown, Mass., and James S. Allen, Santa Fe, N. Mex., assignors, by mesne assignments, to the United States of America as represented by the Secretary of the Navy Application March 8, 1946, Serial No. 652,905

6 Claims. (Cl. 250—27)

This invention relates to electrical computer circuits, and more particularly to circuits for obtaining an output voltage which is proportional to the square root of the input voltage.

In many applications of computers it is necessary to perform the operation of extracting the square roots of a quantity which may be continuously varying. It is proposed to provide an electrical circuit which will produce an output proportional to the square root of the instantaneous value of any quantity which can be represented by a voltage.

Accordingly, it is a principal object of this invention to provide an electronic circuit in which the output voltage is proportional to the square root of the input voltage.

It is also an object of this invention to provide an electronic circuit for extracting square roots in which the response of the output voltage to changes in input voltage is substantially instantaneous.

It is further an object of this invention to provide an electronic circuit for extracting square roots which will operate successfully over a wide range of input voltages.

The above and further objects of this invention will be made apparent by the following detailed description and the appended drawings of which:

Figure 1:
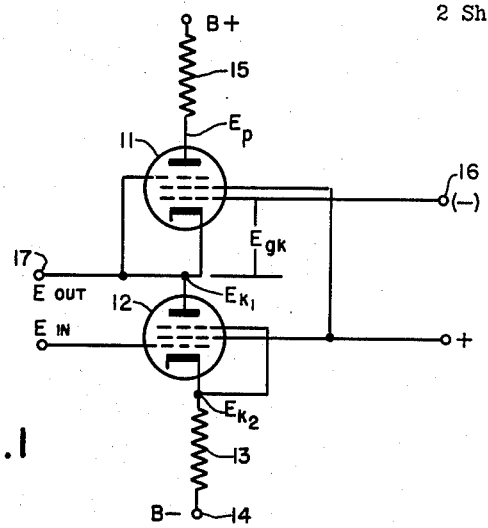
Fig. 1 is a schematic diagram of a simple form of one embodiment of the invention.

The basic principles of the invention are illustrated by Fig. 1. Pentode electron tube 11 constitutes a vacuum tube amplifier in which the output voltage, as normally obtained from the plate, is approximately proportional to the square of the input voltage to the grid. That is, $$\Delta E_p = C_1 (\Delta E_{gk})^2$$

where $\Delta E_p$ is the change in the plate potential of pentode 11 corresponding to a change, $\Delta E_{gk}$, in the grid cathode potential and $C_1$ is a constant. Pentode 11 is further connected in series with pentode electron tube 12 by a direct coupling between the cathode of pentode 11 and the plate of pentode 12. By means of this series connection it is possible to control the plate current, $i_{pl}$, of pentode 11 by means of a signal applied to pentode 12. Since pentode 12 is connected in a manner similar to the conventional cathode follower circuit, for purposes of explanation of the operation of the invention, the term "cathode follower" will be used hereinafter in connection with circuits similar thereto. In the case of pentode 12, the change in potential, $\Delta E_{k2}$, at its cathode will be proportional to the input signal, $E_{in}$, applied to the control grid. This can be expressed by the relation $$\Delta E_{k2} = A E_{in}$$

where $A$ is the amplification factor of the cathode follower. The current, $i_{k2}$, passing through cathode resistor 13 is given by $$i_{k2} = \frac{E_{k2} - (B-)}{R_1}$$

where $R_1$ is the resistance of cathode resistor 13, and $B-$ is the negative cathode voltage applied at terminal 14. Hence, the change in cathode current, $\Delta i_{k2}$, is proportional to the input signal, $E_{in}$, since:

$$\Delta i_{k2} = \frac{\Delta E_{k2}}{R_1}$$

and $$\Delta E_{k2} = A E_{in}$$

as stated above. From the circuit of Fig. 1 it may be seen that the cathode current of pentode 11 is the plate current of pentode 12. Since the plate currents of both pentodes will be proportional to their respective cathode currents, the change in the plate current of pentode 11 will be proportional to the input signal $E_{in}$, applied to the grid of pentode 12. The change in potential at the plate of pentode 11 due to this change in plate current, $\Delta i_{pl}$, can be expressed as:

$$\Delta E_p = R_2 \Delta i_{pl}$$

where $R_2$ is the resistance of plate load resistor 15. Since pentode 11 is a square law amplifier, the grid-cathode voltage, $E_{gk}$, will assume a value such that the previously stated expression $$\Delta E_p = C_1 (\Delta E_{gk})^2$$

is satisfied. In this embodiment the bias on the grid of pentode 11 is kept fixed by a potential applied at terminal 16, so the entire change in grid-cathode potential appears at the cathode of pentode 11 and at terminal 17 as $E_{out}$. From the above relations $$\Delta E_p = C_1 (\Delta E_{gk})^2 = C_1 (E_{out})^2$$

and $$\Delta E_p = R_2 \Delta i_{pl} = C_2 E_{in}$$

it is apparent that $$E_{out} = C_3 \sqrt{E_{in}}$$

where $C_2$ and $C_3$ are constants. The circuit of Fig. 1 then performs the desired function of presenting an output voltage which is proportional to the square root of the input voltage.

Figure 2:
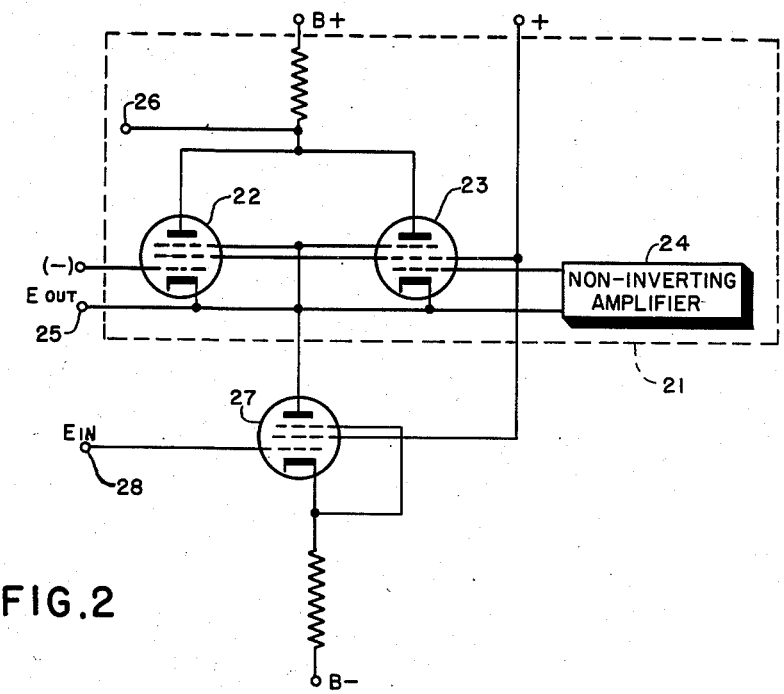
Fig. 2 is a partial schematic diagram of a second embodiment of the invention.

The second embodiment of the invention as shown in Fig. 2 utilizes the same principles explained with reference to Fig. 1. The simple one-tube amplifier 11 of Fig. 1 is replaced by a special square law amplifier 21 such as is disclosed in the copending application of France B. Berger and William B. Higinbotham, Serial No. 561,021, filed October 30, 1944. Amplifier 21 employs two pentodes 22 and 23 with common plate and common cathode circuits, driven in push-pull by means of non-inverting amplifier 24. If an input voltage $e_s$ is applied at terminal 25 of amplifier 21 there will result an output voltage at terminal 26 which is proportional to $(e_s)^2$. The current drawn through squaring amplifier 21 is controlled by a cathode follower 27, the voltage change at terminal 26 being proportional to the input voltage $E_{in}$, to cathode follower 27 at terminal 28. As described with reference to the previous embodiment, this will result in the output voltage, $E_{out}$, appearing at terminal 25 being proportional to the square root of the input voltage, $E_{in}$, at terminal 28. In this circuit, as well as that of Fig. 1, tubes 22, 23, and 27 may be pentodes of the 6B8 type, although other tube types having similar characteristics may be employed.

Figure 3:
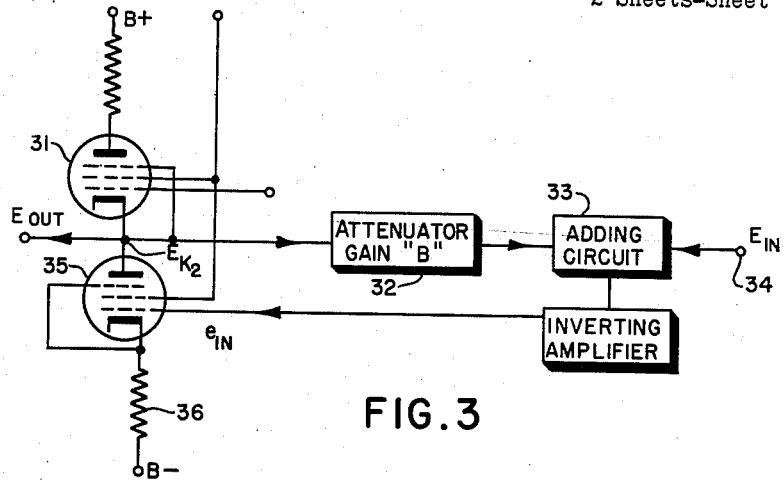
Fig. 3 is a partial schematic diagram of a third embodiment.

A third embodiment of the invention is shown in partial schematic form in Fig. 3. In the circuit of Fig. 3 the squaring element of the previous embodiments is replaced by an amplifier and feedback circuit comprising pentode electron tube 31 and attenuator and adding circuits 32 and 33 respectively. Tube 31 has a response characteristic of the form $$i_p = a + b e_g + c e_g^2$$

where $i_p$ is the plate current, $e_g$ the grid voltage, and $a$, $b$ and $c$ are constants. From this equation it can be seen that in the circuit of Fig. 3

$$\Delta i_p = b(-E_{k2}) + C E_{k2}^2$$

where $\Delta i_p$ is the change in plate current through tube 31 corresponding to a change in the cathode potential $E_{k2}$, measured from the proper reference level. The input voltage, $E_{in}$, applied at terminal 34 is combined in adding circuit 33 with the output of attenuator 32, resulting in an input voltage to cathode follower 35 given by the relation $$e_{in} = E_{in} + B(-E_{k2})$$

As in the discussion of Fig. 1

$$\Delta i_{k2} = \frac{A \Delta e_{in}}{R_1}$$

where $i_{k2}$ is the cathode current of tube 35 and $R_1$ is the resistance of cathode load resistor 36. Since the plate current, $i_p$, of tube 31 is proportional to $i_{k2}$, the following relation will hold:

$$-R_1 b E_{k2} + R_1 C E^2{}_{k2} = A(E_{in} - B E_{k2})$$

and if B is adjusted to be equal to $$\frac{R_1 b}{A}$$

then $$R_1 C E_{k2}{}^2 = A E_{in}$$

or $$E_{k2} = \sqrt{\frac{A E_{in}}{R_1 C}}$$

Figure 4:
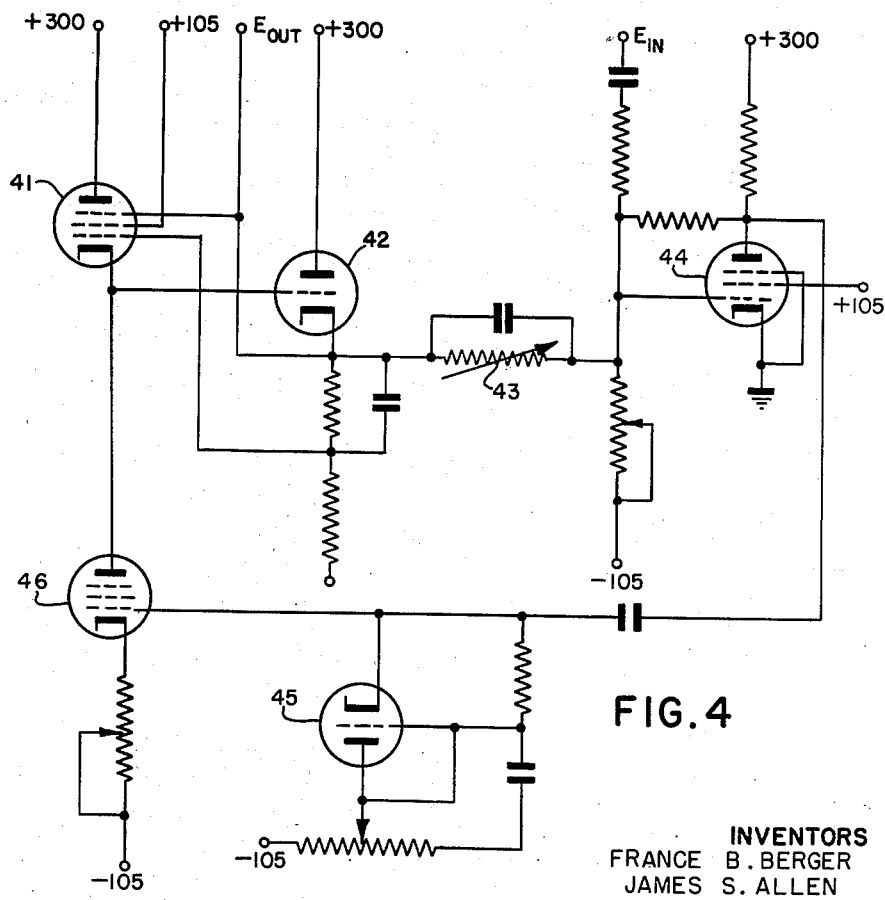
Fig. 4 is a complete schematic diagram of the embodiment of Fig. 3.

Fig. 4 is a complete schematic diagram of one form of the embodiment of Fig. 3. Electron tubes 41 and 42 comprise the squaring amplifier represented by tube 31 in Fig. 3. Tube 42 is connected as a true cathode follower and used to drive the attenuator and adding circuits and the output to improve the high frequency response of the system. The screen characteristic of tube 41 is used rather than the grid characteristic to allow a greater range of the "control voltage" on the squaring element. Variable resistor 43 performs the function of attenuator 32 (Fig. 3) and electron tube 44 acts as the adding circuit 33 and as the inverting amplifier. Electron tube 45 is connected as a diode and is used as a D. C. restorer to establish a given bias on the grid of cathode follower 46 regardless of the duty cycle.

Several embodiments of this invention have been described to illustrate the principles thereof. Other embodiments will suggest themselves to those skilled in the art and no attempt has been made in this specification to exhaust such possibilities. The scope of the invention is defined by the appended claims.

What is claimed is:

1. An electronic circuit for extracting square roots comprising, first and second electron tubes having common plate and cathode circuits, a driving amplifier, said first and second electron tubes being driven in push-pull by said driving amplifier, and a third electron tube adapted to receive an input voltage wave, the conduction of said first and second electron tubes being controlled by said third electron tube, the output voltage obtained from said common cathode circuit being approximately proportional to the square root of said input voltage wave.

2. An electronic circuit for extracting square roots comprising, an electron tube amplifier, control means adapted to control the flow of current through said electron tube amplifier, a feedback circuit adapted to receive the output of said amplifier, means for combining the output of said feedback circuit and an input voltage wave, means for applying said combined feedback and input voltages to said control means, and means for abstracting an output voltage from said electron tube amplifier which is approximately proportional to the square root of said input voltage wave.

3. An electronic circuit for extracting square roots comprising, first and second electron tubes, each including a plate, control grid and cathode, said first electron tube being connected as an amplifier, said first and second electron tubes being coupled in series by a direct connection between said cathode of said first electron tube and said plate of said second electron tube, an attenuator fed by an output from said cathode of said first electron tube, and an input circuit adapted to combine the output of said attenuator and an applied input voltage wave, the combined voltages obtained from said input circuit being applied to said control grid of said second electron tube whereby the resultant output from said cathode of said first electron tube is proportional to the square root of said input voltage wave.

4. A computer circuit comprising a pair of electron tubes having common plate and common cathode circuits and having the characteristic of providing an output potential substantially proportional to the square of a potential applied to the input circuit thereof, a third electron tube, means for applying an input signal to said third electron tube, said third electron being electrically coupled to said pair of electron tubes and arranged to vary the current through said pair of electron tubes substantially linearly as a function of said input signal, means in circuit with said pair of electron tubes and energized by said current for maintaining the output circuit potential of said pair of electron tubes a substantially linear function of said current, and means for deriving an output signal substantially proportional to the square root of said input signal from the input circuit of said pair of electron tubes.

5. Apparatus as in claim 4 including means for driving said pair of electron tubes in push-pull comprising a non-inverting amplifier connected between the common cathode circuit and a grid of one of said pair of electron tubes.

6. A computer circuit comprising, first and second pentode electron tubes, the cathode of said first pentode tube being directly connected to the anode of said second pentode tube, the grid of said first pentode tube having constant bias applied thereto, said first pentode tube having a square law characteristic, an attenuator energized from said cathode of said first pentode, an adding circuit, means for applying an input signal and the output of said attenuator to said adding circuit, an inverting amplifier energized by the output of said adding circuit, means for applying the output of said inverting amplifier to the grid of said second pentode tube whereby the output of said first electron tube is varied substantially linearly with said input signal, and means for deriving an output signal substantially proportional to the square root of said input signal from the junction of said cathode of said first pentode tube and the anode of said second pentode tube.

References Cited in the file of this patent

UNITED STATES PATENTS

| | | |
|---|---|---|
| 1,943,986 | Nyman | Jan. 16, 1934 |
| 2,269,001 | Blumlein | Jan. 6, 1942 |
| 2,310,342 | Artzt | Feb. 9, 1943 |
| 2,358,428 | White | Sept. 19, 1944 |
| 2,400,734 | Beckwith | May 21, 1946 |
| 2,428,541 | Bagley | Oct. 7, 1947 |
| 2,535,257 | Berger | Dec. 26, 1950 |

FOREIGN PATENTS

| | | |
|---|---|---|
| 736,369 | France | Sept. 19, 1932 |